F. W. DICKERMAN.
JAR OPENER.
APPLICATION FILED APR. 26, 1913.
1,110,908.
Patented Sept. 15, 1914.
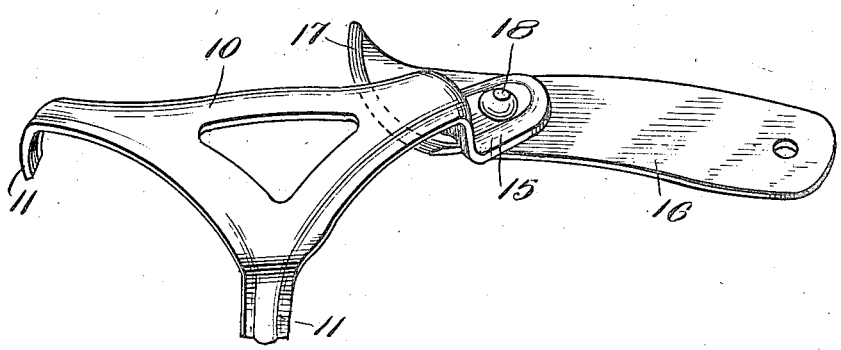
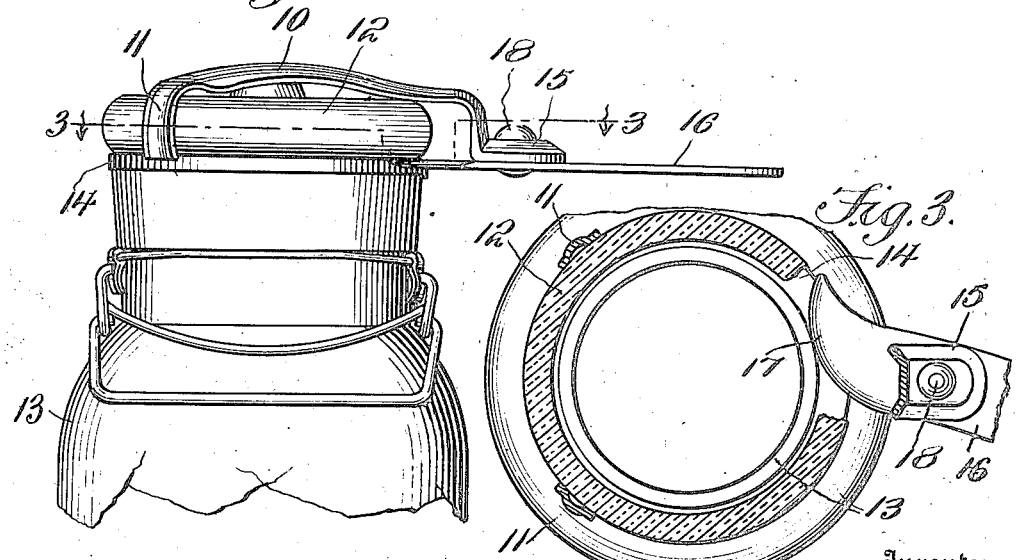

UNITED STATES PATENT OFFICE.

FRED W. DICKERMAN, OF BOSTON, MASSACHUSETTS.

JAR-OPENER.

1,110,908. Specification of Letters Patent. Patented Sept. 15, 1914.

Application filed April 26, 1913. Serial No. 763,825.

*To all whom it may concern:*

Be it known that I, FRED W. DICKERMAN, a citizen of the United States, residing at Allston, Boston, in the county of Suffolk and State of Massachusetts, have invented new and useful Improvements in Jar-Openers, of which the following is a specification.

An object of the invention is to provide a simple and efficient device for opening jars, particularly jars known as preserving jars.

The invention embodies, among other features, a device consisting of substantially two pivotally conected parts which can be cheaply manufactured and in which one of the parts engages the cover of the jar and the other is movable relatively to the first part to extend between the cover and the usual gasket of the jar so that when a pressure is exerted on the said other or movable member the cover will be lifted from the jar.

In the further disclosure of the invention reference is to be had to the accompanying drawings, constituting a part of this specification, in which similar characters of reference denote corresponding parts in all the views, and in which:

Figure 1 is a perspective view of the device; Fig. 2 is a side elevation, showing the manner of applying the device to a jar; and Fig. 3 is a horizontal sectional view taken on the line 3—3 in Fig. 2.

Referring more particularly to the views, I provide a substantially triangularly shaped body 10 preferably formed of a single piece of material and including integral spaced depending arms 11 adapted to engage the periphery of a cover 12 for a jar 13 having a suitable gasket 14 thereon, the gasket 14 being interposed between the jar and cover when the cover is in sealed position on the jar. The body 10 also includes a flange 15 preferably formed adjacent the apex of the triangularly shaped body 10, as shown.

A lever 16 has one end thereof constituting a suitable handle and the other end of the said lever is provided with a cam-like edge 17, a suitable headed pin 18 being arranged to pass transversely through the flange 15 and lever 16 to pivotally connect the lever with the body 10 adjacent to the cam-like edge 17 of the lever as shown.

In the use of the device described, the body 10 is applied to the cover 12 so that the arms 11 will lie against the periphery of the cover, with the main portion of the body 10 spanning the cover and lying above the same, as shown. The lever 16 is now swung so that the cam-like edge 17 will pass between the cover 12 and gasket 14 on the jar 13, after which an upward pull is exerted on the lever, thus readily removing the cover from the jar. Inasmuch as the cam-like edge 17 is almost as sharp as the edge of a knife blade, the device can be employed to loosen the gasket 14 relatively to cover 12 if the same should happen to have become attached thereto through the rotting of the rubber from which the gasket is made, this operation being accomplished prior to pulling upwardly on the lever 16 and after the cam-like edge 17 has been inserted between the cover and gasket sufficiently to permit of pushing on the lever 16 so as to rotate the body on the cover and thus permit the cam-like edge to be moved entirely around the neck of the jar in order to sever the gasket from the under side of the cover thereof. It should be particularly noted that the cam-like edge 17 is curved to the arc of a circle, which, however, is not struck from the point of pivotal connection of the body 10 and lever 16, so that the cam-like edge 17 will be offset relatively to the vertical longitudinal plane of the lever 16, this feature being desired so that the device described herein can be applied to covers of jars of various sizes. It will be apparent that the article can be cheaply manufactured, it consisting simply of the body 10, the lever 16 and the pin 18 pivotally connecting the body and lever.

Having thus described my invention, I claim:

As a new article of manufacture, a jar opener comprising a body formed of a single piece of material and having a triangular shape to provide three relatively diverging arms, integral depending gripping members formed by bending the free ends of two of the arms downwardly, a depending flange formed on the other arm, with the said flange and said gripping members being equi-distantly spaced apart and said flange being offset to provide a horizontal portion, and a lever having a cam-like cutting edge and mounted to swing on the said flange, the cutting edge of the said lever being eccentric to the point of pivotal connection of the lever with the flange and with the cutting edge of the lever adapted to project between a jar and the cover thereof when the gripping members are in gripping engagement therewith so that the said cover can be removed from the said jar by an upward pressure on the free end of the said lever.

In testimony whereof I affix my signature in presence of two witnesses.

FRED W. DICKERMAN.

Witnesses:
HAROLD E. COLE,
BLANCHE C. DICKERMAN.